W. F. BAILEY.
WEIGHING SCALE FOR REFRIGERATORS.
APPLICATION FILED AUG. 21, 1911.
1,031,161.
Patented July 2, 1912.
2 SHEETS—SHEET 1.
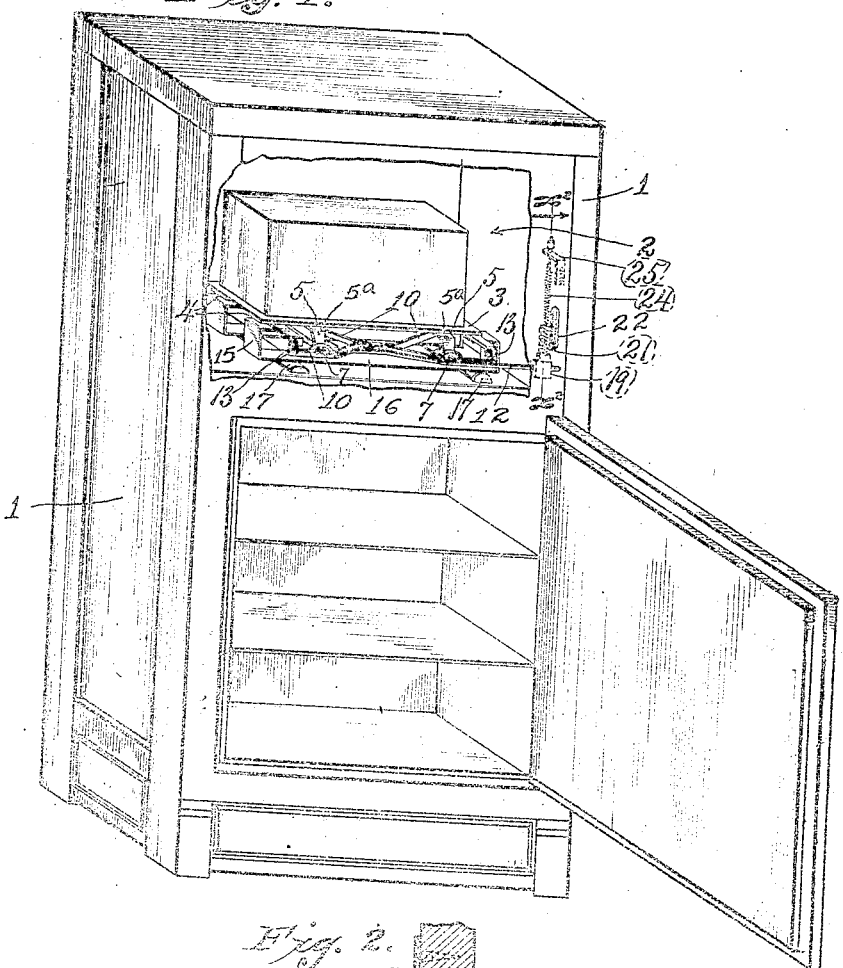
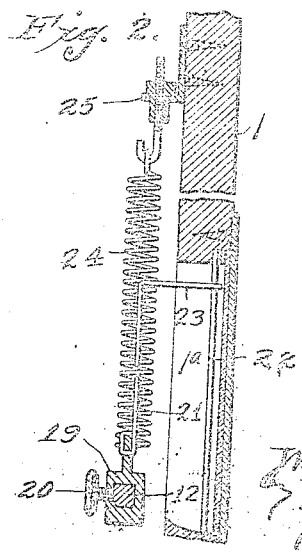

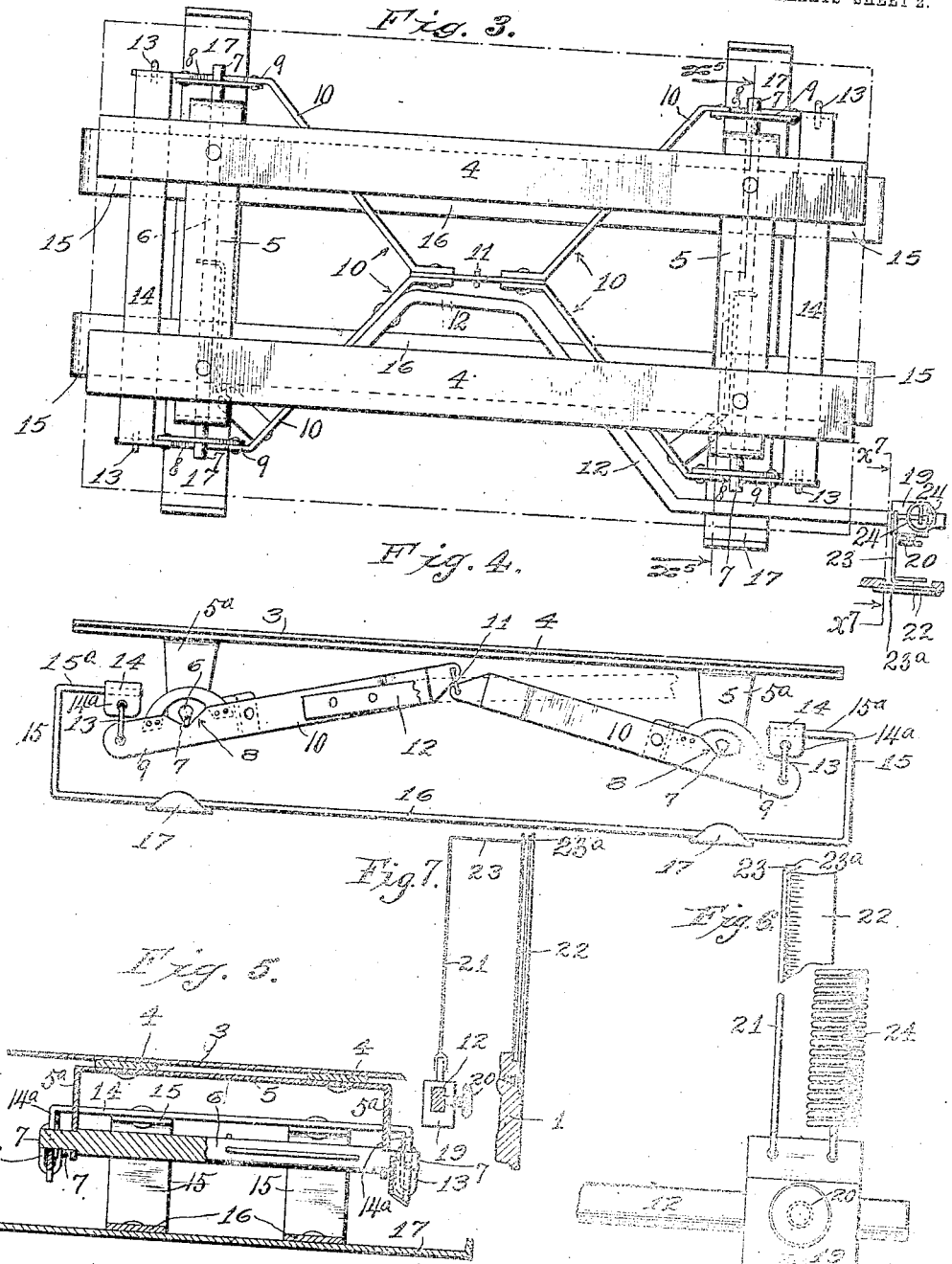

UNITED STATES PATENT OFFICE.

WALTER F. BAILEY, OF LOS ANGELES, CALIFORNIA, ASSIGNOR OF ONE-HALF TO JESSIE M. BAILEY, OF LOS ANGELES, CALIFORNIA.

WEIGHING-SCALE FOR REFRIGERATORS.

1,031,161. Specification of Letters Patent. Patented July 2, 1912.

Application filed August 21, 1911. Serial No. 645,078.

*To all whom it may concern:*

Be it known that I, WALTER F. BAILEY, a citizen of the United States of America, and a resident of Los Angeles, in the county of Los Angeles and State of California, have invented certain new and useful Improvements in Weighing-Scales for Refrigerators, of which the following is a specification.

This invention relates to a device which is adapted to be placed within the ice chamber of a refrigerator for supporting the ice out of contact with the bottom of the ice chamber and for indicating, at a suitable point outside of the ice chamber, the weight of the ice, so that a glance at the indicator will reveal at the time read the exact weight of the ice which is in the ice chamber. This avoids the necessity of weighing the ice away from the refrigerator, after it has been delivered by the iceman, and the purchaser will be informed to a certainty whether the proper amount of ice has been delivered or not, or the amount of ice by weight remaining in the ice chamber.

Referring to the accompanying drawings—Figure 1 is a perspective view of a refrigerator in opened condition, part of the front wall of the ice chamber being broken away so as to reveal the interior thereof with the weighing scale in position. Fig. 2 is an enlarged detail vertical section on the line $x^2$—$x^2$ of Fig. 1. Fig. 3 is a plan view of the weighing scale portion of the device on an enlarged scale. Fig. 4 is a side elevation of the weighing scale; the scale arm being broken away. Fig. 5 is a vertical transverse section on the line $x^5$—$x^5$ of Fig. 3. Fig. 6 is an enlarged detail end elevation of the spring, graduated scale, indicator bar, sliding block and adjacent part of the weighing scale arm. Fig. 7 is a vertical section on the line $x^7$—$x^7$ of Fig. 3.

The refrigerator may be of any preferred construction having a casing 1, provided with an ice chamber 2. Located in the ice chamber 2 is a weighing scale comprising a platform 3, which is supported by two longitudinal bars 4. The longitudinal bars 4 are in turn supported by two transverse frames 5 having downturned ends 5ª. Extending through the downturned ends 5ª of each of the transverse frames 5 is a pivot bar 6 having knife edges 7 which rest in notches 8 formed in the outer parts 9 of two equalizing frames 10. The two equalizing frames 10 are connected at the center by a link 11 and one of the frames 10 has a scale arm 12 riveted thereto and extending beyond the opposite frame as clearly shown in Figs. 1 and 3.

The outer ends 9 of the bars 10 are connected by the links 13 with the downturned ends 14ª of the transverse supporting bars 14 which are carried by the inturned extremities 15ª of the upturned ends 15 of the bottom bars 16. These bottom bars 16 are connected by transverse bars 17, which in turn rest upon the bottom of the ice chamber. The end of the arm 12 extends into the air space 1ª in the wall of the refrigerator and adjustable slidably thereon is a block 19, secured by a thumb screw 20. Connected with the block 19 is an indicator bar 21, the end 23ª of which is movable over a graduated scale 22 which is located in the air space 1ª of the refrigerator. The indicator bar is offset at 23 as shown in Figs. 2, 3 and 7, so that it projects into the air space 1ª in the wall of the refrigerator. Also secured to the block 19 is the lower end of a coil or spiral spring 24, the upper end of the spring 24 being connected to a bracket 25. The spring 24 acts as a balance and resists the weight of the ice tending to move the indicator bar downward. By adjusting the block 19 in either direction on the arm 12, the counterbalance may be varied so as to permit of the weighing scale being adjusted to properly weigh. The construction of the equalizing frames is such that the weight of the ice bears equally on the frames 10 irrespective of the exact position of the ice on the platform 3 and obviously the ice will depress the platform and move down the indicator bar 21 a distance corresponding to the weight of the ice so that a glance at the graduated scale 22 will tell both the ice man and the purchaser the exact amount of ice which is in the ice chamber. This prevents short weight being delivered to customers.

The operation of the weighing scale is obviously automatic and thus no time is required either on the part of the ice man or the customer in weighing or otherwise measuring the ice in order to determine its amount.

Having thus described my invention the following is what I claim as new therein and desire to secure by Letters Patent.

1. A refrigerator comprising an ice chamber, a weighing scale located within the ice chamber and having a scale arm, a block mounted on the scale arm, an overhanging bracket, a graduated scale, a counterbalance spring connecting the block to the overhanging bracket, and an indicator bar secured to the block and having an offset arm provided with an end traveling in front of the graduated scale.

2. A refrigerator comprising an ice chamber and a wall having an air space, a weighing scale located within the ice chamber and having a scale arm, a block mounted on the scale arm, an overhanging bracket, a graduated scale secured within the air space, a counterbalance spring connecting the block to the overhanging bracket, and an indicator bar secured to the block and having an offset arm extending into the air space and provided with an end traveling in front of the graduated scale.

In testimony whereof, I have hereunto set my hand at Los Angeles California this 14th day of August 1911.

WALTER F. BAILEY.

In presence of—
G. T. HACKLEY,
AIMÉE C. BRESLAU.